June 29, 1937.  J. G. H. LIEBEL ET AL  2,085,536
ARC LAMP
Filed Jan. 5, 1931  9 Sheets-Sheet 2
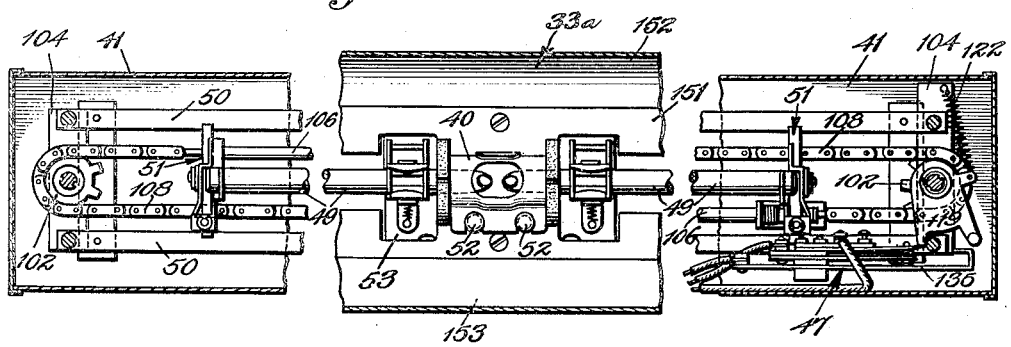
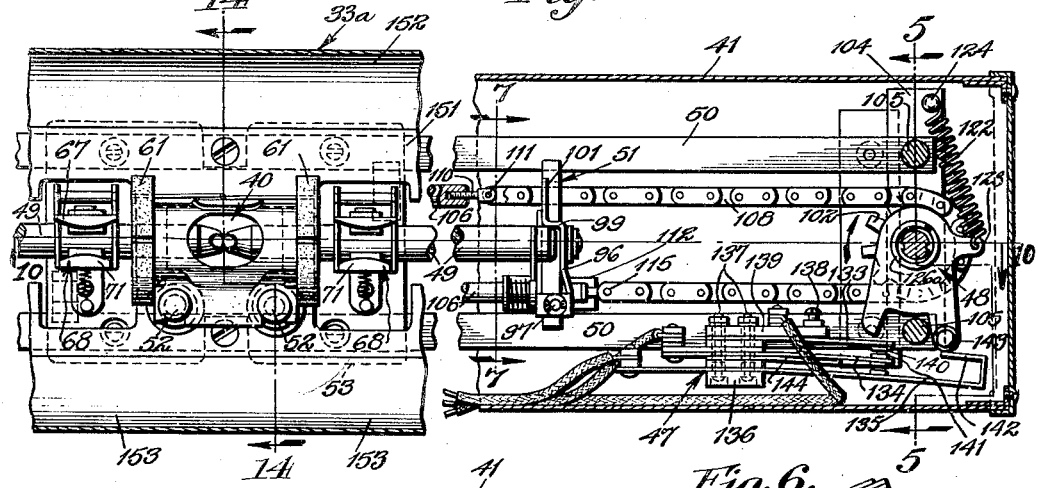
INVENTORS
John G. H. Liebel
BY Edwin S. Flarsheim
Wood & Wood ATTORNEYS

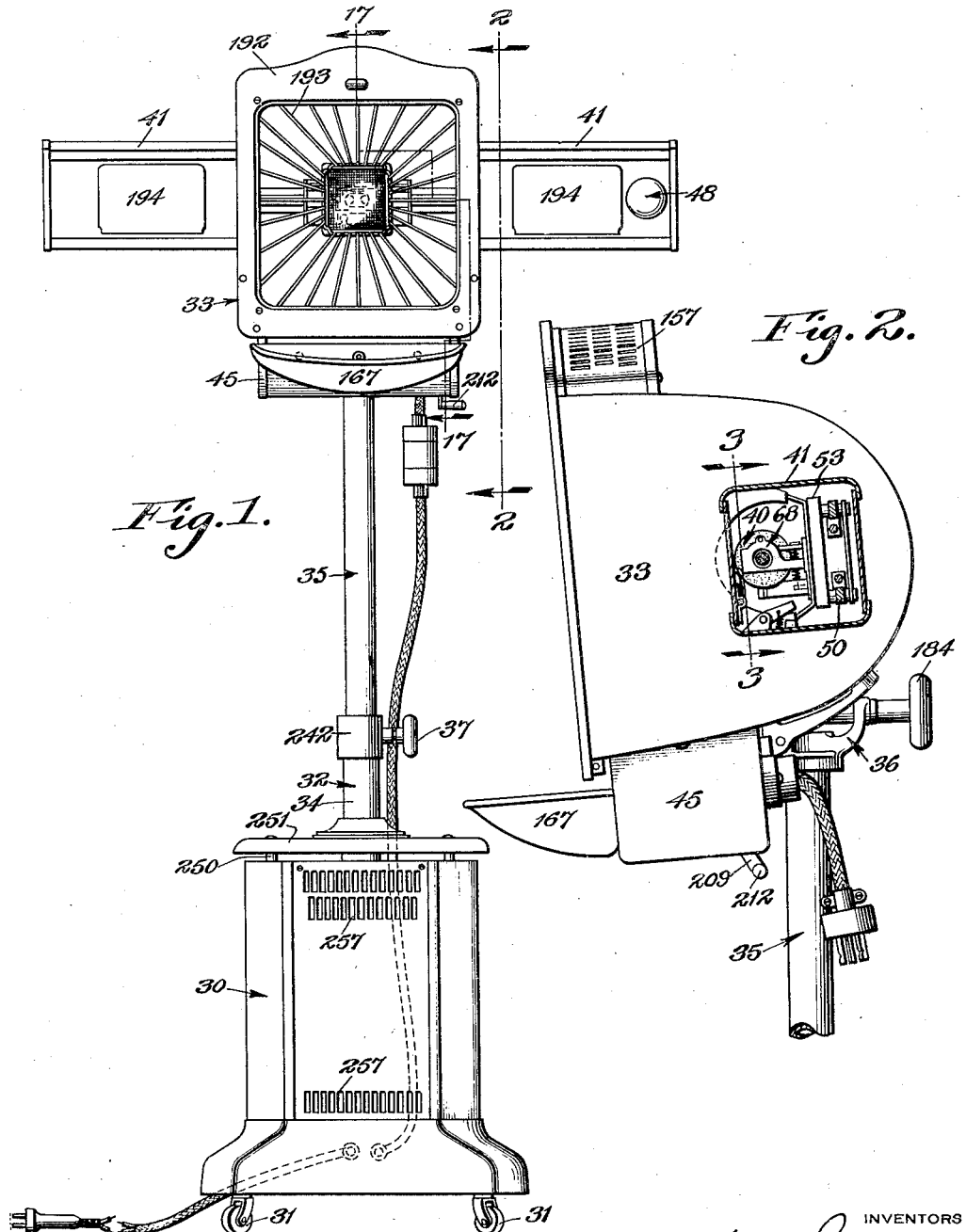

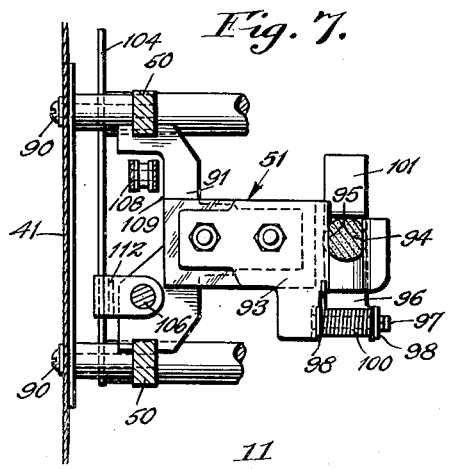

June 29, 1937.  J. G. H. LIEBEL ET AL  2,085,536
ARC LAMP
Filed Jan. 5, 1931   9 Sheets-Sheet 4
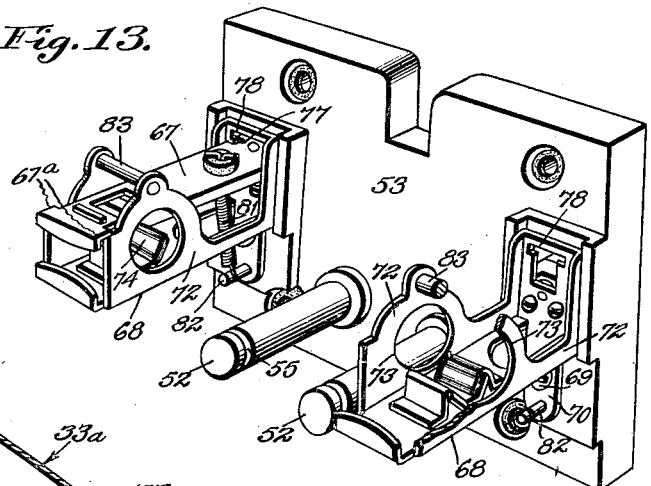
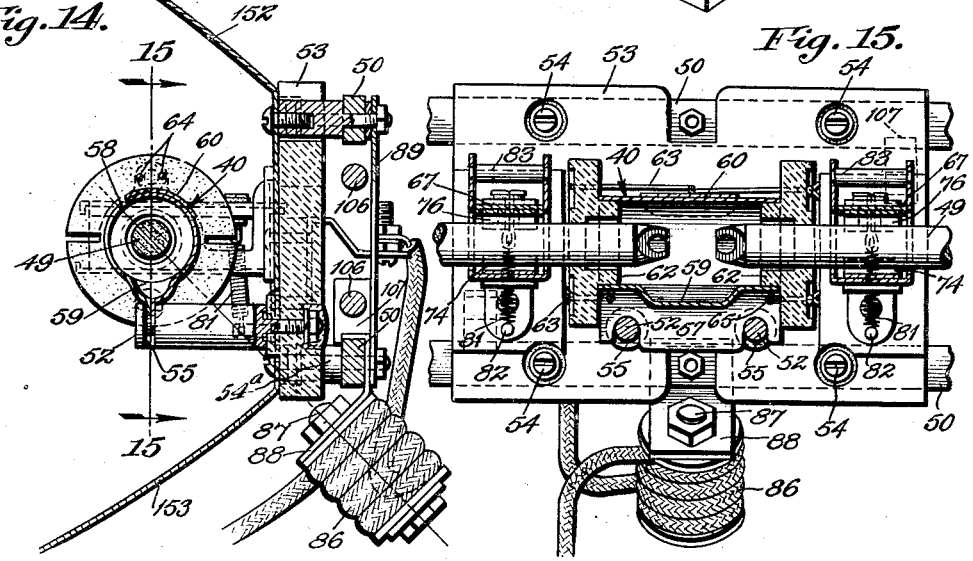
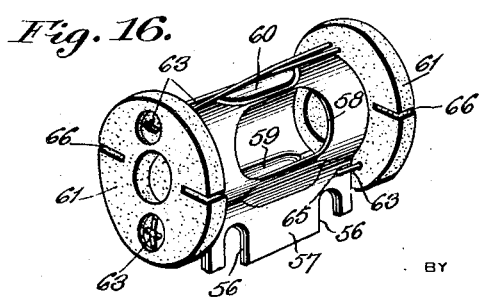
INVENTORS
John G. H. Liebel
Edwin S. Flarsheim
BY Wood & Wood  ATTORNEYS June 29, 1937. J. G. H. LIEBEL ET AL 2,085,536
ARC LAMP
Filed Jan. 5, 1931 9 Sheets-Sheet 5
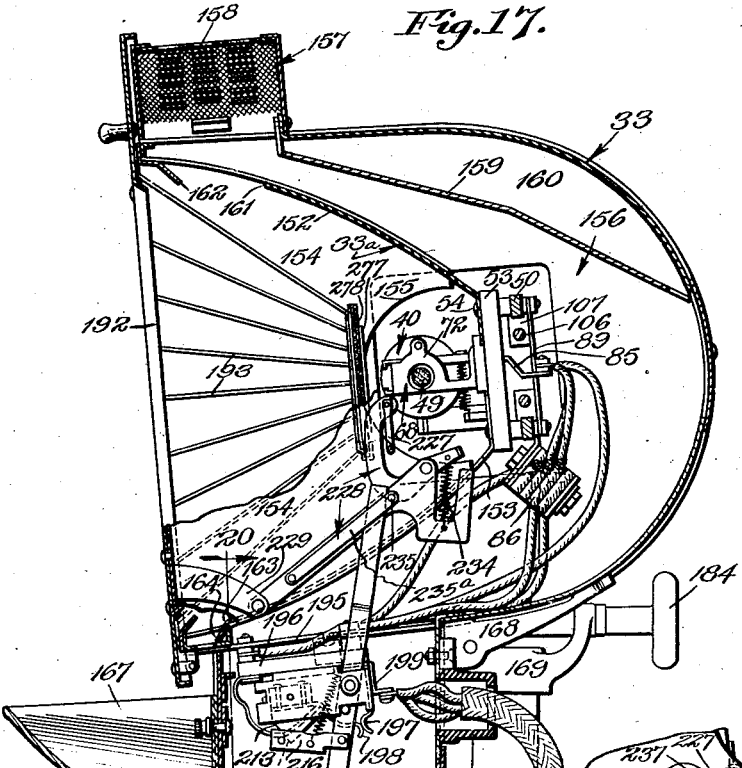

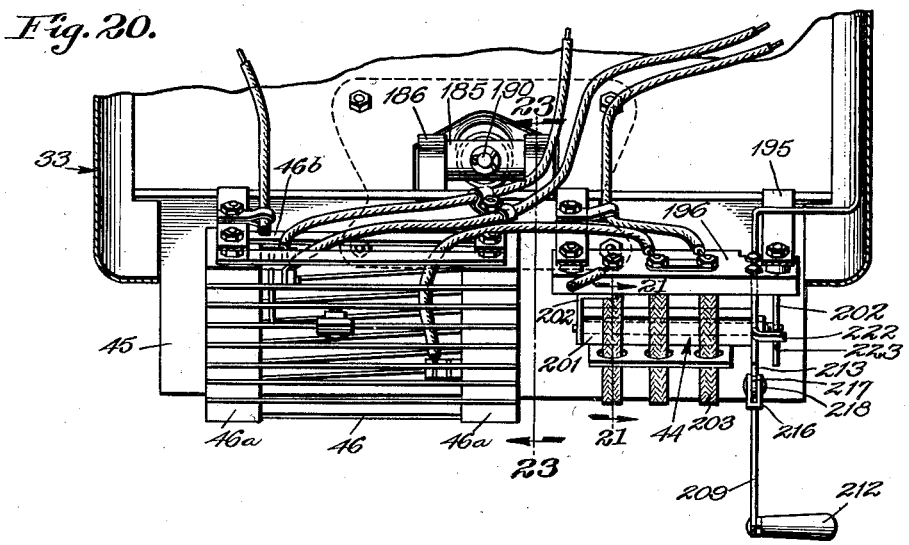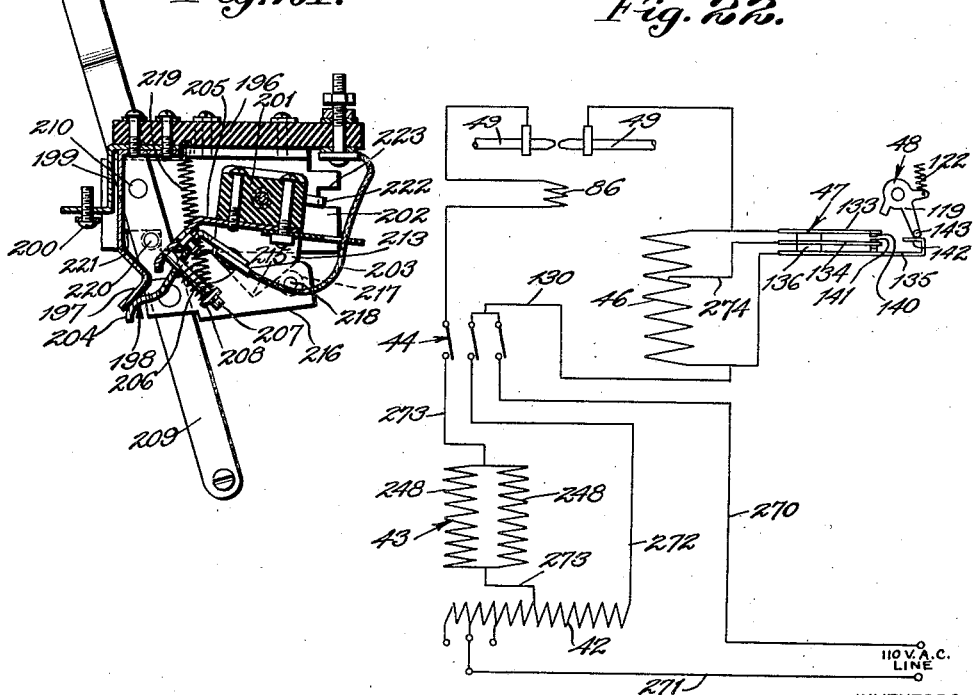

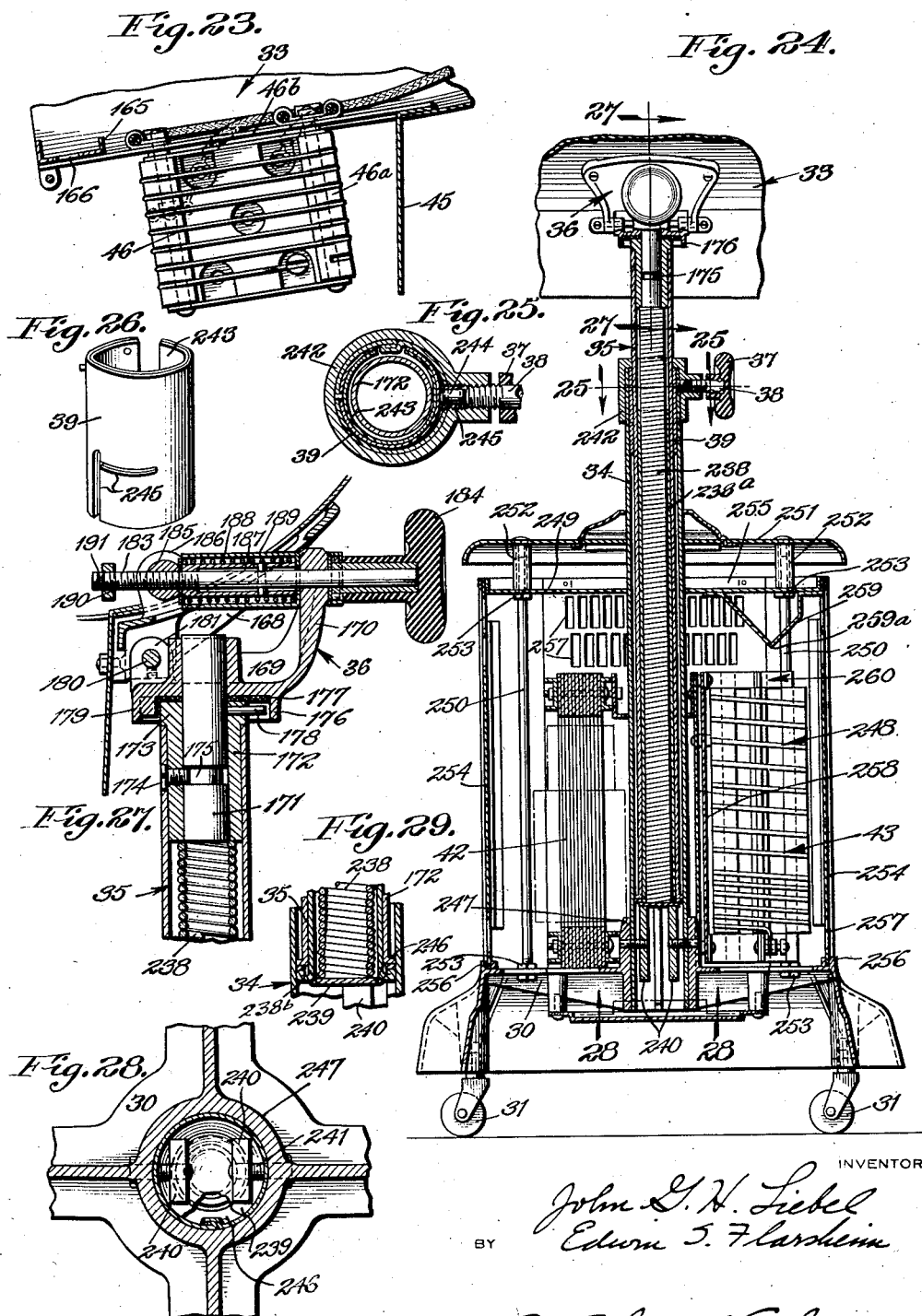

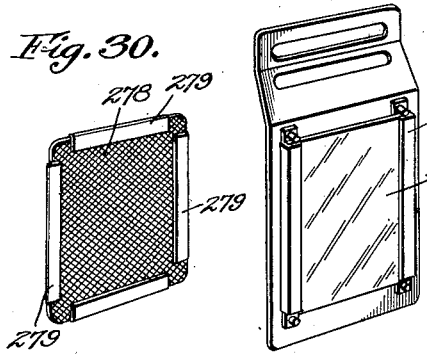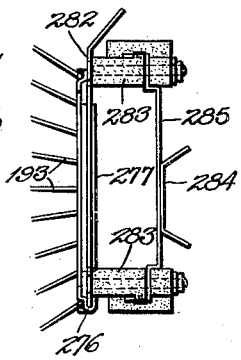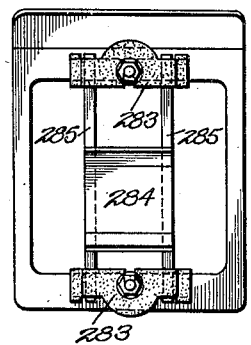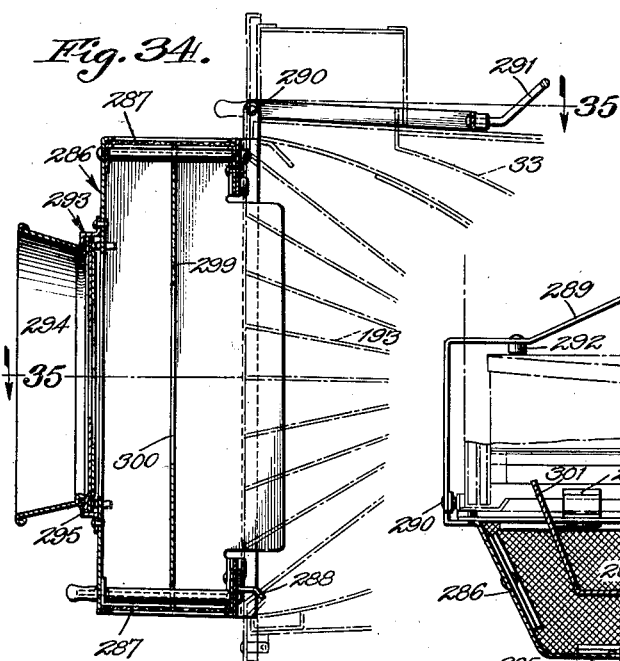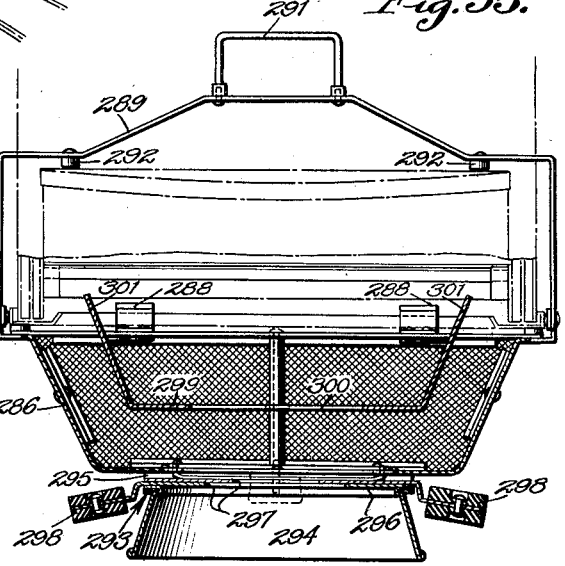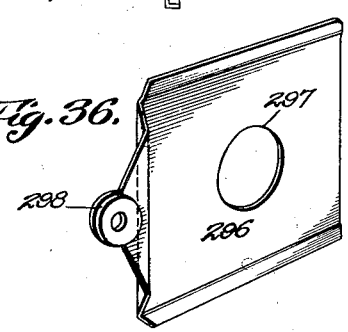

June 29, 1937.  J. G. H. LIEBEL ET AL  2,085,536
ARC LAMP
Filed Jan. 5, 1931   9 Sheets-Sheet 9
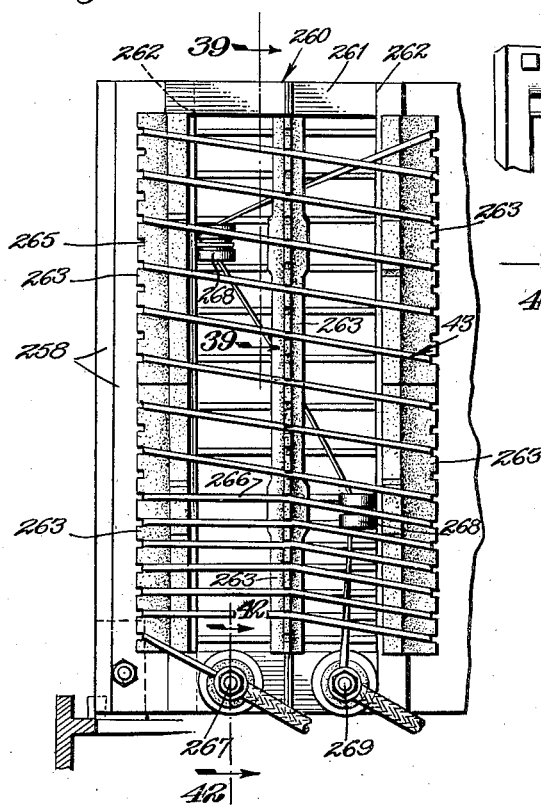
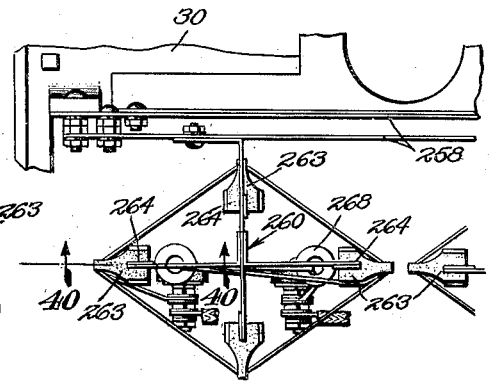
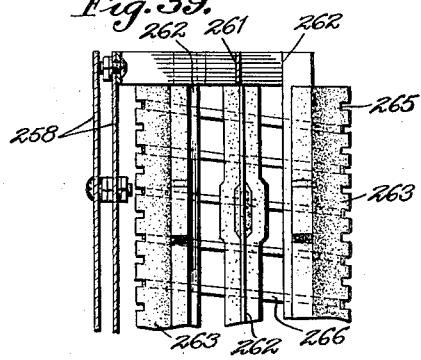
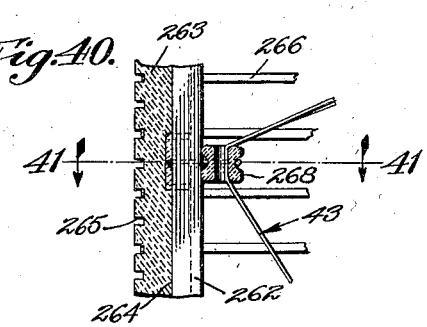
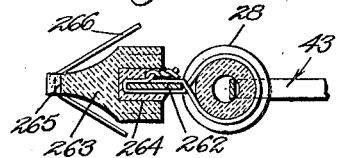
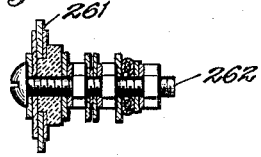
INVENTORS
John G. H. Liebel
Edwin J. Flarsheim
BY
Wood & Wood ATTORNEYS Patented June 29, 1937

2,085,536

UNITED STATES PATENT OFFICE 2,085,536

ARC LAMP

John G. H. Liebel and Edwin S. Flarsheim, Cincinnati, Ohio, assignors to The Liebel-Flarsheim Company, Cincinnati, Ohio, a corporation of Ohio Application January 5, 1931, Serial No. 506,531

10 Claims. (Cl. 176—117)

This invention relates to arc lamps for therapeutic treatments adapted to provide ultra-violet and infra-red radiation as well as visible light. The particular type therapeutic lamp to which this invention is directed, comprises two electrodes, usually of carbon, with which is associated coring or other material adapted to vaporize in the high heat of the arc between the electrodes and thus produce a luminous flame or vapor about the arc.

The problems to which this invention is addressed arise primarily in connection with a lamp of the type disclosed in the co-pending application of Jacquelet & Liebel, Serial Number 323,413, filed December 3, 1928 now issued into Patent No. 1,935,294, November 14, 1933. The arc lamp disclosed in this application comprises two electrodes mounted with their ends spaced, a housing surrounding the spaced electrode ends, and an aperture in the housing so related to said electrodes that the luminous flame or vapor surrounding the arc substantially exclude the oxygen of the atmosphere from the interior of the housing, thus eliminating smoke and fumes and retarding the consumption of the electrodes so that they need not be adjusted or reset during the course of a treatment.

Transparencies are not used to cover the aperture for the reasons that the more available are opaque to ultra-violet radiation, and that films tend to form over all transparencies thereby filtering out valuable therapeutic radiation. The housing surrounds the arc so closely that the housing becomes heated to incandescence by the arc and thus becomes itself a source of infrared radiation.

The above mentioned application further points out that it is preferable to mount the electrodes horizontally with their longitudinal axes aligned, to dispose the aperture in the housing laterally, to throw a beam horizontally or horizontally and downwardly, and to fix the arc in the zone of the aperture by means of a magnetic field. The application also discloses that it is preferable practice to configurate the ends of the carbon electrodes within the housing so that each electrode has a surface partially facing the opposite electrode and partially facing the aperture. This provides a desirable beam of radiation.

While the lamp of the type described is susceptible to useful operation with just the few elements mentioned, still a therapeutic treatment lamp adapted for use in hospitals, clinics and physicians' offices, must be relatively simple, extraordinarily reliable, and so constructed that it is impossible for either patient or operator to come to harm.

The present inventors have taken up the problems of producing a safe, convenient and economical therapeutic lamp with these elements, and have determined that it is at present commercially expedient to use relatively long carbon electrodes which can be operated for a number of hours without replacement, and further, that it is desirable to replace the protective housing with a new housing when the electrodes are renewed in order that the user of the lamp be relieved of the nuisance and burden of cleaning periodically the slag of the electrode cores from the inside of the housing.

In order to provide a therapeutic lamp suitable for the purposes specified, the inventors have proportioned and arranged the elements described, and associated with them other elements, mechanism, and devices to provide a lamp possessed of the following features:

1. A reflector is so disposed about the housing in relation to its emission aperture as to direct a beam of infra-red radiation in the direction of beam of ultra-violet radiation so that both fall upon the patient. This not only has valuable therapeutic effect, but keeps the patient warm and comfortable during the course of the treatment.

2. The housing is mounted within this reflector without the use of nuts, bolts, screws, or movable parts which might adhere, so that the housing can be removed by the user without difficulty and without the use of any tools. Inasmuch as the lamp housing becomes incandescent in operation, there is a tendency for the housing to heat the support for the housing whatever it may be. On this account, the support for the housing is placed at the bottom of the housing which is the coolest part of the housing, and the heat of the housing therefore has a minimum tendency to deteriorate the supports with which the housing is slidably engaged. Moreover, the slideway so disposed constitutes a rigid member which is the coolest part of the housing and therefore tends to support the entire housing when it is in a state of incandescence.

3. Electrical connection is made to the electrodes adjacent to the housing, as distinguished from at the far ends of the electrodes, so as to avoid the electrical potential drop which would be incidental to the passage of current through the long carbon electrodes.

4. This connection is a sliding connection which permits the electrodes to be manipulated from the ends by appropriate mechanism there disposed. (There are great difficulties in providing sliding connections capable of transmitting as much as twenty or thirty amperes without appreciable loss or sparking.)

5. Means is provided for shielding the above described electrical connections from the heat radiating from the housing.

6. As stated, the electrodes preferably used in this lamp are angular on the ends, disposed within the housing so that each electrode end is provided with a surface partially facing the other electrode and partially facing the aperture in the housing. In order that the user shall not insert the electrodes in the housing facing in the wrong direction, the opposite ends of the electrodes by which they are held in appropriate holders, are asymmetrically configurated in such wise that the electrode will not fit in its holder unless the configurated opposite end of the electrode within the housing is facing the aperture.

7. Mechanism is provided so that the user may turn a handle to bring the electrode ends together within the housing, and so that as this manually operable member is released, the electrodes will be automatically separated the desired and predetermined distance considered suitable for the initial arc. This mechanism is so located that it is protected from heat by the reflector.

8. When the electrode ends are in contact or when these ends are but slightly spaced, the flow of current is greater than when the proper gap is established. A starting resistance is therefore provided and is so associated with the mechanism for automatically spacing the electrode ends, that this resistance is placed in series with the electrodes when the electrode ends are touching or are but slightly spaced, but is cut out when the desired gap is established. In view of the fact that the circuit is substantially short circuit when the carbons are touching, it is considered advisable to employ two starting resistances which are cut out as the gap is established, one after the other automatically by the mechanism by which the initial gap is predetermined.

9. Inasmuch as the underwriters' regulations require some sort of screen to be interposed between the arc and the patient, it is deemed advantageous to provide a screen holder disposed in the proximity of the arc chamber, said screen holder adapted to have inserted in it not only the conventional screen, but likewise filtering transparencies as substitutes for the screen or special radiator members adapted to absorb the heat from the arc and emit large quantities of infra-red radiation to the exclusion of the ultra-violet radiation.

10. Also, it is desirable in some cases to localize the treatment and for this purpose an accessory device is provided which is designed to reduce the infra-red beam of radiation without minimizing the ultra-violet beam of radiation.

11. Since it is necessary to have access to the interior of the lamp mechanism for the purpose of changing arc chambers or electrodes, inspection, and the like, the lamp is provided with a series of connected doors. The screen holder is attached to the central door and the side doors provide access to the wings on either side of the lamp casing proper, in which is housed the electrode adjusting mechanism and some of the electrical mechanism. A safety switch is associated with this door mechanism in order that the current be automatically turned off as the doors are opened so that it is impossible for the operator to receive an accidental shock by attempting to adjust the mechanism.

12. In view of the fact that no electrode feeding mechanism is used or recommended, it is desirable to provide electrical means which tends to stabilize the wattage consumed in the arc in the face of a gap of constantly varying length. The therapeutic radiation is essentially a function of wattage; therefore a positive temperature coefficient ballast is provided which insures substantially the same wattage when the arc is initiated, and twenty or twenty-five minutes later just prior to the time when the arc extinguishes itself due to the increasing length of the gap between the electrodes.

13. The arc chamber becomes incandescent in operation and emits large quantities of heat which are directed upon the patient by the reflector. Nevertheless, the reflector tends to become very hot over a period of prolonged use. Therefore, a live air passageway is provided between the reflector and the outer lamp casing, the passageway terminating forwardly and above the reflector in what may be termed the stack at the top of the lamp casing so that a draft is created both behind the reflector to cool it and upwardly across the front of the reflector so that any vaporous products of combustion however minor which may be formed by the arc, are drawn upwardly into the stack.

It will, therefore, be observed that the object of this invention is not only to provide a therapeutic arc lamp which is safe, convenient, and economical, but is also to provide mechanism operative for accomplishing the above outlined advantages.

Further objects and certain advantages will be more fully apparent from a description of the accompanying drawings, in which:

Figure 1 is a front elevation of the arc lamp complete with stand.

Figure 2 is a sectional view of the lamp taken on line 2—2, Figure 1.

Figure 3 is a fragmentary vertical sectional view of the lamp taken on line 3—3, Figure 2, showing the carbon electrodes and adjusting means, the carbon electrodes being shown properly adjusted for providing the necessary gap.

Figure 4 is a sectional view taken similar to Figure 3 but on an enlarged scale, showing the arc chamber casing and the electrode mounting in one wing of the lamp casing, the tips of the electrodes being shown in contact preparatory to starting and switch controlling the starting resistance shown fully opened for cutting off the direct electrical connections to the electrodes and throwing in the starting resistance.

Figure 5 is a sectional view taken on line 5—5, Figure 4, showing the mounting and construction of the adjusting shaft for translating the electrodes.

Figure 6 is a sectional view taken on line 6—6, Figure 5.

Figure 7 is a sectional view taken on line 7—7, Figure 4, illustrating an electrode carriage.

Figure 8 is a side elevation of the body of a carriage.

Figure 9 is a sectional view taken on line 9—9, Figure 8.

Figure 10 is an enlarged horizontal sectional view taken on line 10—10, Figure 4, detailing the mounting of an electrode.

Figure 11 is a sectional view taken on line

11—11. Figure 10, showing details of carbon electrode brush and support and its mounting in the lamp casing.

Figure 12 is a sectional view taken on line 12—12, Figure 11, showing the means permitting pivoting of the brush on its support element.

Figure 13 is a perspective view of the arc chamber casing and electrode brush holders and supports assembled on their support panel.

Figure 14 is a sectional view taken on line 14—14, Figure 4, showing the arc chamber casing in cross section and illustrating the magnet used for controlling the arc.

Figure 15 is a sectional view taken on line 15—15, Figure 14, showing the electrodes properly spaced.

Figure 16 is a perspective view of the arc chamber casing or housing.

Figure 17 is a sectional view taken on line 17—17, Figure 1, showing the details of construction of the lamp casing and the cooperating connections between the doors and the starter switch, with the starter switch shown in "on" position.

Figure 18 is a fragmentary sectional view taken similar to Figure 17 but showing only the lower portion of the lamp casing to illustrate the action of the door and connecting levers in automatically throwing the switch to "off" position.

Figure 19 is a perspective view of the door in one of the wings, looking toward the same from inside the wing of the casing.

Figure 20 is a sectional view taken on line 20—20, Figure 17, showing the starting resistance and main switch in the lower chamber of the casing.

Figure 21 is a sectional view taken on line 21—21, Figure 20, detailing the main switch.

Figure 22 is a diagram of the electrical circuit of the lamp.

Figure 23 is a sectional view taken on line 23—23, Figure 20.

Figure 24 is a vertical sectional view taken through the post and base of the lamp stand for showing the electrical units on the base, a fragmentary rear portion of the lamp casing being included for illustrating the connecting bracket.

Figure 25 is a sectional view taken on line 25—25, Figure 24.

Figure 26 is a perspective view of the split clamping bushing.

Figure 27 is a sectional view taken on line 27—27, Figure 24.

Figure 28 is a sectional view taken on line 28—28, Figure 24.

Figure 29 is a detail sectional view of the lower end of the column.

Figure 30 is a perspective view of the screen insert mounted in the door immediately in front of the arc.

Figure 31 is a perspective view of a filtering device adapted for use in place of the protective screen.

Figure 32 is a rear view of a blind adapted to be mounted in the door immediately in front of the arc for blocking the ultra-violet rays when it is desired to use infra-red only.

Figure 33 is a side elevation of the device shown in Figure 32.

Figure 34 is a vertical sectional view of an appliance adapted to be mounted over the door for blocking out a portion of the ultra-violet rays for local treatment, the door and frame to which the device is attached being shown in dotted lines.

Figure 35 is a sectional view taken on line 35—35, Figure 34, further detailing the local treatment device.

Figure 36 is a perspective view of one of the slides used in the local treatment device.

Figure 37 is a front elevation of one of the ballast units.

Figure 38 is a plan view thereof including fragmentary portions of the base member and the attachment means for the ballast unit.

Figure 39 is a vertical sectional view on line 39—39 Figure 37, of the upper portion of a ballast unit.

Figure 40 is a sectional view taken on line 40—40 of Figure 38.

Figure 41 is a sectional view taken on line 41—41 of Figure 40.

Figure 42 is a detail sectional view taken on line 42—42 of Figure 37.

The machine is generally illustrated in Figure 1 and comprises a base 30 mounted on casters 31. A standard 32 is mounted centrally of the base for supporting the lamp casing 33 on its upper end. The standard or post 32 is telescopical, consisting of two sections, one 34 rigidly mounted on the base and the other 35 directly supporting the lamp casing on the upper end by means of an adjustable bracket 36, the adjustable bracket permitting vertical swinging adjustment or tilting of the lamp casing. The telescopical sections of the post are maintained in set position by means of a knob 37 and screw 38 (see Figures 24 and 25) acting against a split clamping bushing 39. Suitable means is included in the post for counterbalancing the weight of the lamp casing and is contained mechanism for ease in raising or lowering the same relative to the base. The mounting of the lamp casing on the post is of a design also permitting rotative movement of the lamp casing relative to the post.

The lamp casing 33 includes a main chamber in which a reflector 33ª is mounted and in which the arc chamber 40 is disposed, this chamber being open toward a forward end and containing devices for controlling and selectively utilizing the rays or beams developed by the arc.

The adjustment means for the carbon electrodes as well as the electrodes themselves are extended into and mounted in laterally extending wing portions 41 of the lamp casing. The electrical apparatus for the lamp includes a transformer 42 and electrical ballast 43 mounted directly on the base 30, surrounding the lower end of the standard or post, a main switch 44 mounted in a lower chamber extension 45 of the lamp casing and electrically connected to the transformer and ballast by flexible connections, a resistance 46 mounted in the lamp casing extension 45 and a control switch 47 for the resistance mounted in one of the wings and actuated by the manually actuated means 48 adjustably moving the carbon electrodes 49—49.

The arc chamber casing 40 is mounted in the central chamber of the lamp casing in alignment with the wing portions and is supported on vertically spaced rails 50—50 which extend longitudinally through the lamp casing between the outer ends of the respective wings, these rails functioning as guide rails for the outer movable supports or carriages 51—51 for the carbon electrodes extending into the wings.

The arc chamber casing 40 is supported on studs 52—52 extending out from and fixed to a panel or block 53 of refractory material such as porcelain or any other material providing insulating properties. This panel or support block is secured to the rails by means of screws 54 extending through the panel and rails for receiving nuts on the rear sides of the rails and spacer sleeves 54ᵃ disposed between the rails and block or panel 53 for spacing the panel from the rails.

The support block 53 also includes the forwardly extending studs 52—52 which are secured in spaced relation in horizontal plane by any conventional means such as casting in the material or a shouldered and bolted arrangement as shown. The outer ends of the studs are provided with deep annular grooves 55. The arc chamber casing (see Figure 16) is formed of a strip of refractory metal such as chrome nickel. This strip is formed into a cylinder and the joined ends are disposed radially and spot-welded together. Slots 56 are provided in the radial fin 57 thus formed, permitting the casing to be engaged downwardly upon and about the studs, the slots of the studs permitting the casing to be fitted into the annular grooves 55 in the studs for a solid support.

Prior to the formation of the strip into cylindrical form, a port hole 58 of oval form is punched in the material, this port hole being disposed toward the front of the arc chamber casing as mounted in the lamp casing and being longitudinally disposed relative to the axis of the cylinder. The slots engaging the support studs are also formed in the strip prior to formation into cylindrical shape. Also, there are depressions formed in the metal which, when brought together, provide a pocket 59 at the base of the chamber directly below the arc, functioning as an ash receiver space into which the solid products of combustion are deposited as they drop from the tips of the carbon electrodes.

The small piece of metal 60 which is punched out of the port hole is spot-welded onto the top of the chamber, providing additional metal on the upper side of the chamber and serving as a means for conducting away to the other portions of the chamber, the excessive heat which would otherwise develop in the upper end and rapidly deteriorate the material of the chamber casing at this point. The addition of the piece of metal increases the life of the chamber to an extent providing a safe margin of life for the chamber over the life of a pair of carbon electrodes.

It is to be noted at this point that after a pair of electrodes have been consumed, due to the simplicity of mounting and construction of the arc chamber, the entire chamber may be removed and thrown away in preference to spending time and energy in cleaning the same. The radiating fin 57 constituting the attaching portion of the chamber, is of considerable length and as much metal is left therein as is possible, excluding the necessary slots, in order that the extension besides acting as the support, may function as a heat radiating fin, rapidly dispelling the heat at this point and preventing undue damage to the support pins.

Discs or bushings 61, generally formed of refractory clay, are secured on the respective ends of the cylinder. These discs include circular bosses 62 extending into and accurately fitting the interior diameter of the casing so as to permit ready axial alignment of the discs and cylindrical casing. The discs include central apertures through which the carbon electrodes extend into the interior of the arc casing. These end closures or bushings are drawn together on the casing by means of refractory or chrome nickel wires 63 extended between small apertures 64 in the discs. The upper connecting wire extends directly between the discs, whereas the lower wires are extended through apertures 65 in the radiating fin and outwardly through the apertures in the discs where they are wound together.

In order to prevent cracking and crumbling of the discs, due to expansion and contraction strains, radial slots 66 are provided therein extending in from the periphery of the discs.

The discs are of relatively great diameter as compared with the diameter of the arc casing for the purpose of protecting, against the heat emanating from the arc, the carbon electrodes beyond the casing and the brushes 67 and holders or electrode supports 68 providing the electrical connections to the respective carbons close to each side of the arc chamber. The long carbon electrodes are supported at each end, the brushes and electrical connection including the necessary support at the inner ends, and the guided carriages 51 being provided at the outer ends, the necessary adjustment movement being imparted to the electrodes through these carriages and appropriate motion transmitting mechanism.

Each brush holder and electrode support at a respective side of the arc casing or chamber is attached to the block 53 of refractory insulating material by means of screws 69. The parts of each brush and holder are of stamped construction and the holder or support 68 includes a rear attaching flange 70 a base flange 71, extending horizontally outwardly under the particular electrode, side flanges 72—72 extending upwardly from each side of the base flange, which side flanges 72—72 are provided with apertures 73, traversed by the electrode, of greater diameter than the electrode and entirely clear thereof. The parts of the brush and holder are of silver in order that the electric conductivity of the parts will be maintained despite long use due to the fact that the metal yields electrically conductive oxides. The electrodes are supported on specially constructed electrical contact seats 74 mounted on the base flange.

Each seat is generally channel-shaped, extending longitudinally beneath the carbons, the carbon resting in the channel and the channel having inclined side walls with arc-shaped seats snugly fitting the contour of the electrodes and outwardly flared end edges 75 for eliminating shearing or scraping of the electrodes as they are slid through the brushes. The channel includes side flange extensions 76 which are suitably bent and silver-soldered in place in the base flange for positive electrical connection of the seat thereto. The brush 67 of each support is pivotally attached to the support at its inner end and includes an inverted contact seat 76a of the same structure as the seat 74 on the support. The brush 67 is formed of a stamped strip of metal extending longitudinally of the holder at right angles to the electrode and having the contact seat 76a attached on the lower side of its outer end. The inner end of the brush plate has its side edges adjacently slotted as at 77, this end, in the process of assembly, being inserted through a slot 78 of slightly greater cross sectional dimension than the plate, the end then being free after slight insertion to be moved downwardly, causing the slots to fit about the side edges of a downward slot continuation of the slot 78.

A contact point 79 on the underside of the inserted brush end thereupon engages upon another contact point 80 secured on the inside surface of the attaching flange 70 of the holder, the refractory block being cut away to provide the necessary clearance for these contacts. The engagement of these two contact points provides the electrical connection at this point and also permits an easy rocking movement therebetween during the raising and lowering of the brush when the electrode is being inserted between the seats.

The brush is urged downwardly against the carbon electrode by means of a coil spring 81 under tension between a stud 82 extending from the extreme lower end of the attaching flange of the holder and having its upper end flexibly connected to the brush, the material of the base flange of the holder being cut away to entirely clear the centrally disposed spring for free movement thereof. The connection of the spring to the brush is by means of a headed bushing 81$^a$ of electrical and heat insulating material hung in an opening in the brush and a clip 81$^b$ attached to the spring and extended through the bushing and spread above the bushing (see Figure 11). The spring is located so as to provide for the necessary free cooling by means of cool air passing through the slot and the open sides of the support.

Immediately above the brush a cross pin 83 is provided joining the side flanges for stabilizing the holder and preventing undue upward movement of the brush. The brush is limited in downward movement by virtue of the engagement of lateral flanges 67$^a$ with the upper edges of the support to prevent collapse against the lower contact and inability to enter the carbon between the contact. A flexible electrical connector 84 is electrically connected to the electrode brush and support by means of a terminal 85 held in position against the back of the support block by means of the screw 69 which secures the holder in position.

The electrode brush support 68 is attached on a raised portion of the panel 53. The attaching wall includes an extension extending below the raised portion and therefore spaced from the panel. A special connection is provided at this point to the terminal clip providing the electrical connection between the clip and the brush holder. A sleeve 69$^a$ extends through a bore in the panel. The inner end of the sleeve abuts the attaching wall of the support and the outer end is threaded through the terminal clip.

A screw 69 attaches the extension of the support to the sleeve and a nut 69$^b$ is engaged upon the screw threads of the sleeve against the outer face of the clip for locking the sleeve to the terminal clip. The sleeve is headed at its inner end in order that it will be locked in position in the panel after the terminal clip and nut are in place.

As has been disclosed in the co-pending Jacquelet & Liebel Patent No. 1,935,294 issued November 14, 1933, the arc is fixed in the zone of the aperture by means of a magnetic field. This magnetic field is provided by the arrangement of a coil of wire 86 directly behind and below the arc chamber, the coil being wound on an axis which is radially disposed relative to the chamber approximately at a 45° angle from horizontal plane. For this purpose a core 87 is supported at the angle described, on a clip 88 which is hung from the lower longitudinally disposed guide rail 50. Suitable nuts and washers are provided and arranged on each end of the core for securing the coil of wire between the washers. The flow of current through this coil of wire, which is connected in series with the arc, creates the magnetic field.

The longitudinally disposed guide rails 50—50 are reinforced and definitely spaced at a central point by means of a strap 89 bolted in position for connecting the same. The longitudinally disposed rails which function as guides for the carriages which support the outer ends of the respective electrodes, are mounted in the casing by means of screws 90 extending through spacer sleeves. The respective carriages are of the same construction so that the description will be confined to a particular carriage mounted in one of the wings.

The carriage body or main element 91 is of T-shape, the outer edge of the head of the T being slotted for clearance purposes. The respective tips of the head of the T are transversely slotted as at 92 for sliding engagement with the respective rails, the carriage being mounted between the rails. The shank of the T extends outwardly at right angles from the rails and carries an element 93 directly supporting the electrode end, the latter element being attached to and insulated from the carriage body. These parts 91, 93, are bolted together and inserts of insulation are provided between the respective parts as well as between the heads of the bolts and about the bolts where they traverse the carriage body. The electrical connections to the electrodes are made, as has been described, entirely adjacent the inner or burning ends and the carriages are insulated from the framework for preventing electrical connection of any sort at the outer ends.

The support element 93 has an offset outer end and a slot 94 is formed extending downwardly from the upper edge of the support element. The slot is located in the inclined portion of the plate at the offset. Therefore, the respective side edges of the slot are not aligned.

The carbon electrodes include transverse notches 95 on opposite sides thereof. These notches are not aligned and each carbon electrode is adapted to fit in the slot of its support or holder with the notches thereof fitting about and registering with the respective disaligned side edges of the slot in the holder. It will, therefore, be appreciated that due to this asymmetrical arrangement of the notches in the electrode, and slot edges in the holder, the electrode can be placed in only one position in the holder. This is done for the purpose of maintaining a definite relation of adjacent angular ends of the electrodes within the arc chamber.

Each electrode inner end is provided with a surface partially facing the opposite electrode and partially facing the aperture in the housing. This angular arrangement of the electrode ends is provided for the purpose of insuring a more efficient burning of the electrodes when they are initially used, the angular arrangement representing the shape of the ends which results after a short period of burning.

In order to prevent upward displacement of the outer end of each electrode a spring-urged clip 96 is provided, this clip being hinged on the electrode carriage on a pin 97 extending transversely relative to the electrode and beneath the same, the pin being fixed to a downwardly extended flange of the carriage element 93. The clip is of plate structure including a pair of ears 98 traversed by the pin for mounting the clip and has its upper swinging end provided with an offset portion 99 horizontally disposed and engaging the top surface of the electrode. A coil spring 100 is wound about the support pin or hinge stud and has its ends respectively attached to the holder and the clip for urging the clip into position relative to the electrode. An upward extension 101 of the clip is included for purposes of manipulation.

A common transmission means is provided for uniformly moving both electrodes by translating the carriages along the rails, moving the same toward each other or away from each other as desired. For this purpose a sprocket wheel 102 is mounted in each wing at the extreme end thereof, the sprockets being disposed between the rails with their axes disposed transversely to the common vertical plane of the rails. The sprockets include trunnions 103 which are journalled in spaced vertically disposed straps 104 mounted on studs 105 extending from the respective sides of the rails. A semi-rigid, semi-flexible endless transmission chain extends around and between the respective sprockets. This chain is formed partially of conventional sprocket chain links and partially of rods.

Each carriage has a rod 106 rigidly fixed thereto extending parallel with and between the rails, the inner ends of the respective rods being slidably journalled in journal blocks 107 fixed to the rails directly behind the support block supporting the arc chamber. The purpose of these rods is to stabilize the carriages and prevent rocking thereof on the rails.

One of the rods extends from the upper portion of its carriage in alignment with the run of chain at the upper side of the sprocket and the other is disposed in alignment with the lower run of the chain. The outer end of each rod carried by a respective carriage is connected to the other carriage by means of sections 108 of sprocket chain links extending about the respective sprockets, these chain links passing through the clearances defined by notches 109 in the heads of the carriages.

The connections of the runs of chain to the ends of the rods are adjustable and consist of studs 110 screwed into the ends of the rod and a cross pin 111 disposed through the heads of the studs and adjacent chain links.

One of the connections of the chains to the carriages is adjustable, this being for the purpose of definitely applying tension to the chain at all times for eliminating slack. In the instance of this connection, a U-shaped bracket 112 is provided having one of its ears slidably mounted on a rod and engaged against a compression spring 113 coiled about the rod between the ear and a carriage, and having the other ear at the opposite or outer side of the carriage connected to the adjacent run of chain by means of a stud 114 mounted on the latter ear and a cross pin 115 extended through the stud and the end links of the chain.

The transmission means is actuated by means of a knob 116 fixed to a trunnion of one of the sprockets, the knob being disposed at the outside of the casing wing. The knob may be formed of bakelite cast about a metal sleeve 117. The metal sleeve is attached to the trunnion of the sprocket by means of set screws 118. The knob is in direct positive connection with the sprocket at all times.

A means is provided in conjunction with the manipulating means, for adjusting the electrodes, whereby the electrodes may be brought together and then definitely spaced a predetermined amount upon release of the knob at any time, thus rendering the accurate and efficient spacing of the electrodes an automatic operation. For this purpose, a motion limiting plate 119 is loosely mounted on a trunnion of the sprocket. This plate is of segmental form including a slot 120 in its outer edge providing abutment extensions 121 engaging the respective sides of one of the studs 105, as the knob is swung in respective directions. The amount of sprocket rotative movement allowed between alternate abutment of the respective extensions 121 with the stud permits movement of the electrodes to an extent providing the definite spacing required. The motion limiting element 119 is definitely and normally held in the position accomplishing the spaced position of the electrode ends by means of a spring 122 under tension between a lug 123 on the circumferential edge of the segment and a stud 124 mounted on the upper end of one of the straps supporting the sprocket.

The motion limiting plate 119 or space governing device is in rotative connection with the sprocket by means of a slip device. At each side of the plate structure of the motion limiting device and about the trunnion of the sprocket, a friction disc 125 is disposed and rotatively attached to the motion limiting or driving plate. Against each friction disc a pressure or driving washer 126 is disposed. These washers 126 are rotatively connected to the trunnion. The assembled parts, including the swinging plate element 119 are urged along the trunnion against the hub of the sprocket by means of a coil spring 126ᵃ under compression about the trunnion. An adjustable means is provided for maintaining the spring under compression, this means consisting of a nut 127 in screw-threaded engagement with the trunnion engaged against a washer 128 directly abutting the adjacent end of the spring.

It will be apparent that as it becomes necessary to readjust the spacing of the electrodes within the arc chamber, the operator turns the transmission knob to bring the ends of the electrodes together. This movement is possibly due to the slip connection between the spacing plate 119 and the sprocket. If it should happen that the ends of the electrodes are widely separated, the limit plate only moves with the sprocket until its particular abutment arm strikes the stud constituting the stop, whereupon it is held stationary and rotation of the knob is continued to bring the electrode ends together.

The moment the operator allows the knob to return, the governing plate is acted upon by the spring 122 and rotates the sprocket due to the friction connection thereto to swing the plate against its normal stop whereupon the electrodes are properly spaced. The spring which returns the governing device back to normal abutment, easily rotates the sprockets and moves the transmission without disturbing the slip device, since the carriages and electrodes move freely.

A switch 47 is associated with the electrode translating means for controlling a resistance in the electrical connections which extend to the electrodes, this resistance being necessary for lowering the amperage because of the fact that the flow of current is greater when the electrode ends are in contact or when these ends are but slightly spaced, than when the proper gap has been established.

After the main switch has been thrown in for permitting the introduction of current to the electrodes, the nob is turned to bring the carbon electrode ends into contact where they are held for a few seconds, whereupon the knob is allowed to return slowly and evenly to normal running position with the carbons properly spaced. During this release operation the switch mentioned is operated. When the carbons meet, the wiring is such that the resistance is in series with the electrodes (see wiring diagram). The electrical flow is substantially short circuited when the carbons are touching and as the spacing takes place, the starting resistance is cut out in two sections one after the other automatically by the mechanism of the switch controlled by the means which governs the appropriate spacing or gap between the electrodes. The resistance mentioned is entirely in series with the electrodes when the electrode ends are touching or are but slightly spaced, and is entirely cut out when the desired gap is established. Therefore, the switch is of multi-blade construction employing a series of contacts. It will be noted from the wiring diagram that one of the leads namely 130, extending from the main switch 44 includes the resistance 46 and connects directly to the particular electrode. The current must flow through this lead, via the resistance 46 when the electrodes are touching since the switch contacts are all disengaged at this time.

There are three switch blades 133, 134, 135 mounted on a support block 136 of insulating material attached to the lower guide rail, there being a block of insulation between each switch blade. The bolts 137 binding the parts together are properly insulated from the metal blades. The upper blade 133 which is electrically connected directly to the particular electrode, is adjusted by means of a set screw 138 extending through a block of insulating material 139 extending out over the blade, the adjusting screw flexing the blade downwardly the desired amount for spacing it relative to the parallel intermediate blade 134, a contact point 140 being provided at the outer end of the upper blade 133 for efficient electrical contact with the similar contact 141 of the intermediate blade.

The lowermost blade 135 or the one first actuated by separating movement of the electrodes, includes an upwardly flanged outer end including a horizontal flange 142 which is engaged by a roller 143 of insulating material mounted on the swinging electrode space governing plate, this roller depressing the lower blade 135 when the electrodes are in contact and permitting flexing of the blades 133, 134 resulting in spacing of all the contact points of the blades. The intermediate blade 134 is limited in its downward flexing movement, when released by depression of the lower blade, by means of a rigid support blade 144 extending out therebeneath. In the first phase of release of the lower blade, due to upward swing of the roller, the lower blade 135 contacts the intermediate blade 134. The lower blade is directly connected to the electrical supply and the electrical connection therefore proceeds directly to the intermediate blade 134, short circuiting a portion of the resistance. This blade 134 is connected to one of the intermediate coils of the resistance and therefore the current must pass through a portion of the resistance only, rather than through the entire resistance which was previously true when the electrodes were in direct contact.

Upon continued separation of the electrodes and release of the lower blade which is strong enough to move the intermediate and upper blades, the intermediate blade still contacting the lower blade contacts the upper blade 133 and it thereby occurs that the current passes directly from the main line to the electrode entirely excluding the resistance. The resistance coil 46 is wound about porcelain supports 46a hung on cross straps 46b in the lower chamber of the lamp casing.

The reflector 33a previously mentioned is provided for the purpose of directing the infra-red or heat rays emanating from the incandescent arc chamber casing 40 forwardly through the opening in the front of the lamp casing. The reflector is formed of a sheet of material providing a vertical rear wall 151 and forwardly curved upper and lower walls 152, 153. End plates 154 are secured to the mentioned sheet of material for closing the ends of the reflector and covering the various parts located within the casing for operating the doors and switches of the lamp. The end plates are cut away as at 155 to provide ample clearance for the electrodes extending from the interior of the reflector into the wings of the casing.

The reflector 33a is best illustrated in Figure 17, this view also bringing out the arrangement of the reflector relative to the main casing for providing a passageway 156 producing the necessary draft to carry off the excess heat produced by the arc. The draft takes place upwardly through the switch and resistance casing 45 thence between the walls of the reflector and the main casing and forwardly above the reflector into a stack 157 mounted on the top of the main casing.

The top of the stack is perforated for permitting escape of the heat, the perforations providing the necessary outlet for producing the draft. A strip of wire mesh 158 is inserted in the stack on the underside of the top thereof for enhancing the appearance of the lamp and closing the interior of the stack against vision.

As a further aid to proper circuit for the draft, a baffle plate 159 is mounted across the upper confines of the main casing providing an insulating space 160 and preventing overheating of the upper surface of the casing.

The upper end of the upper curved wall of the reflector terminates short of the forward edge of the main casing as at 161 for the purpose of permitting the escape of convection heat from the interior of the reflector upwardly through the stack.

A deflector strip 162 is attached along the extreme forward upper edge of the reflector opening for directing the convection heat rising along the upper curved wall in the manner described above.

The composite design of the reflector and the aperture in the reflector upper wall in combination with the stack and screen results in condensation in the stack of any slight vapor products which may arise from the arc.

Provision is also made for the convenient disposal of any ashes or solid products of combustion dropping from the tips of the electrodes into the reflector in that the lower curved wall of the reflector also terminates slightly short of the forward edge of the main casing as at 163 and is flanged downwardly at a more abrupt angle than that of the curved wall. The downwardly extending lip or flange 164 rests along the rear flange of a channel piece 165 secured along the lower edge of the opening in the main casing, the channel strip including an elongated slot 166 in its base web. Just below the slot and in position for efficiently receiving the matter falling through the slot, an elongated receptacle 167 of dish or tray form is bolted to the casing.

The main lamp casing containing the arc chamber casing and the various mechanisms described is rotatably mounted on the standard or post to permit substantially a full 360° of movement. The same bracket which rotatably mounts the lamp on the post also includes a manually operable adjusting means for tilting the lamp in a vertical plane for directing the ultra-violet rays and heat rays as desired by the operator.

The bracket providing the rotative and tilting movement for the head consists of two main elements 168, 169. One of these elements, namely the upper 168, is of general arcuate form to fit the contour of the back of the lamp casing and is bolted thereto. The other element, namely 169, is of circular form and includes an upwardly extending journal arm 170 and a downwardly extending stud 171 which extends into the upper section of the post. The stud 171 is journalled in a sleeve 172 fixed in the upper end of the upper section, the sleeve including a head 173 resting upon the upper edge of the section. A set screw 174 extended through the section of the post and the sleeve maintains the sleeve against displacement.

The inner end of the screw 174 also extends into an annular groove 175 in the stud for the purpose of permitting rotative movement of the stud in the sleeve and preventing upward or axial displacement of the stud. A circumferential flange 176 extends downwardly from the body of the bracket element for the purpose of housing the connection.

A disc or washer 177 is mounted within the housed portion of the bracket element and in position of assembly is disposed between the head of the sleeve and the bracket element. This disc or washer is formed of a material resisting a too free rotative motion between the parts and is inserted for the purpose of sustaining the thrust. For the reason that there are flexible electrical connections extending from the base of the machine to the head, a means is provided for limiting the rotative movement of the head in one direction to approximately 360°, thereby eliminating the possibility of the flexible electrical connections becoming entangled about the post. This limitation of movement is accomplished by means of a pin 178 extending radially from the head of the bushing and constituting a fixed stop and abutted, after approximately 360° of rotative movement of the lamp casing in either direction, by a boss 179 cast within the housed portion of the journal element.

The upper element of the bracket is fixed to the lower element in such fashion that they rotate unitarily. The connection between these parts is a pivoted one, the pivotal movement taking place on a horizontal axis. A pivot pin 180 is fixed between a pair of ears 181 cast at opposite sides on the upper surface of the circular bracket element 169. The upper bracket element 168 includes a pair of downwardly extended ears traversed by the pivot pin 180. This upper bracket element 168 including the lamp casing mounted thereon is swung on the pivot pin by means of an adjusting screw rod 183 journalled in the bearing arm 170 of the lower element and carrying a knob 184 on its outer end and having a screw-threaded inner end engaged diametrically through a rod 185 which is rotatively mounted in a horizontal plane parallel to the pivot pin 180 joining the elements of the bracket. This rod or rock shaft 185 is mounted in a pair of spaced ears 186 cast as a part of the upper element. The adjusting screw is loosely rotatively mounted within the journal arm of the bracket and is maintained against axial displacement by means of a sleeve 187 screwed onto the rod and fixed in position on the rod abutting the inner face of the journal arm in opposition to the hub of the knob 184 abutting the opposite side.

A coil spring 188 is mounted under compression, about the screw and sleeve, between the rock shaft 185 and the journal arm 170 for the purpose of eliminating any lost motion in the rock-shaft. A housing sleeve 189 is disposed about the spring. A nut 190 is held in place on the extreme inner end of the screw by means of a cotter pin 191 for the purpose of limiting forward tilting movement of the lamp casing or head as well as preventing total disconnection of the adjusting means and the rock shaft.

As has been previously disclosed, a main switch is mounted in the lower chamber of the main lamp casing. This switch is included for the purpose of controlling the application of electrical current to the head of the machine, the switch being inserted in the electrical circuit between the transformer and the brushes or the electrodes. To prevent physical contact with the arc or its casing and the surrounding parts, a door 192 is provided in the opening of the reflector, this door including a grill 193 of the proper mesh for preventing insertion of the hand and yet permitting efficient passage of the infrared and ultra-violet rays produced by the arc. The main control switch is manually thrown either to on or off position. As an additional safety feature, the grill door 192 and the switch are interconnected by cooperating linkage which is effective for throwing the switch to off position as the door is opened in the event that the operator has neglected to cut off the power. A small door 194 is provided in each wing of the casing, these doors being opened and closed by means of connections extending to the main door 192 in the opening of the reflector.

The main switch is detailed in Figure 21 and is shown in position within the machine in Figures 17 and 18. The switch is hung on a pair of straps 195 disposed across the opening between the switch chamber and the main lamp casing. A panel 196 of insulating material supports the parts of the switch, the panel being bolted directly to the straps. The switch includes three sets of contacts for the respective leads extending from the base into the head. These leads are suitably connected to the resistance and the electrodes and the resistance control switch in the head as will be more fully apparent from the description of the wiring diagram which will follow hereinafter.

The stationary contacts 197 of the switch depend from the panel of insulating material and include turned contact ends disposed opposite to the movable contacts 198 of the switch. The respective leads extending from the base are connected to these stationary contacts by means of terminal clips 199 and screws 200. The movable contacts 198 component to the stationary contacts are mounted on a rock element 201 of insulating material pivotally mounted in end brackets 202 attached at each end of the panel of insulating material. The leads extending from the switch into the head are connected to the panel and then to swinging contacts 198 by flexible connectors 203 of conventional design. The swinging contacts 198 are in two pieces, the actual contact sections 204 to which the flexible leads 203 connect being yieldingly mounted relative to the sections which attach the contacts to the rock element.

The contact sections 204 are L-shaped, each flexible connection being to one arm of a particular L-shaped contact section and the outer end of the other arm being suitably contoured to contact the opposing stationary contact. These elements are designed to rock on the shoulders of studs 205 on the stationary sections traversing the contact sections substantially at the juncture of the arms thereof. The flexibly mounted contacts 204 are urged against the respective fixed sections by means of springs 206 under compression between stud 207 extended from the fixed sections through the flexibly mounted elements and providing heads 208 between which heads and the flexibly mounted elements the springs 206 are disposed under compression. Therefore, it occurs that the contact of the moving contacts with the stationary contacts is a yielding one induced by spring pressure due to the fact that the throw of the moving switch elements is such as to compress the springs.

The operating means for the switch is of a design readily described as a "snap" switch mechanism. The main operating lever 209 is fulcrumed on one of the side brackets of the switch by means of a pivot pin 210 of the bracket. The lower end of this lever extends below the casing through a slot 211 therein and carries a knob 212 conveniently accessible for manual operation of the lever.

The upper end of the main lever 209 is adapted to be engaged and moved by the linkage between the main door and the doors in the wings when the switch is in on position. A cam element 213 is fixed to the rock shaft. The cam element includes angularly related lower edges 214 and an intermediately disposed point 215 constituting dead center for the switch. A link 216 is pivoted to the main control lever beneath its fulcrum. This link is formed of a longitudinally folded strip of material straddling the lever at its attached end and having a roller 217 mounted between spaced overlap portions at the opposite end to the pivot. This roller is mounted on a stud 218 disposed in the respective sides of the link and is maintained in engagement with the lower inclined edges of the cam by means of a spring 219 attached under tension between an intermediate point of the link and the body of the switch. Therefore, it occurs, since both the inclined surfaces of the cam are angularly disposed relative to the link, that the moment the roller is drawn past the tip or juncture of the inclined surfaces, the spring acts to throw the lever quickly to the particular side. Movement is thereby imparted to the cam due to the direction of thrust thereon, the inclined edges being disposed in such fashion that engagement against these edges induces movement of the swinging contacts in reverse directions.

Swinging movement of the main operating lever is limited by means of the engagement of a pin 220 extending from one side thereof with the respective ends of a slot 221 formed in the end bracket of the switch. It is also provided that rocking movement of the swinging contacts is limited due to provision of a lateral extension 222 on the cam extending into another slot 223 in the end bracket of the switch for engaging the respective ends of this slot. This latter slot is of a sufficient length to permit yielding of the contact sections of the movable contacts in the making and breaking of the electrical connections.

When the switch is in on position, the upper end of the operating lever is swung into the path of movement of the linkage between the doors as the doors are moved to open position. All of the doors are hinged along their lower edges so that their movements are in the same direction. The doors move through arcs which correspond substantially.

The hinge rods 224 for the wing doors are journalled in the walls of the wings and rolled lower edges 225 of the doors are fixed about the hinge rods by means of screws 226. The inner ends 227 of these hinge rods 224 are extended at an angle forwardly or upwardly of the machine and are pivotally connected to sectional links 228 joining the same to brackets 229 fixed to the inner face of the main door at the front of the reflector. The links are sectional for the purpose of permitting flexibility in the linkage during the movements of the main door and the wing doors. The opening movements of the wing doors do not start until the main door has been partially opened for a reason which will be described later.

The flat sections 230, 231 of the links are pivotally attached in adjacent planes by means of pivot pins 232. The section 230 of each link connected to the hinge rod 224 of the particular inner door includes an extension 230ᵃ beyond the pivot pin. Each forwardly disposed section 231 also includes a U-extension 233 beyond the pivot point. A spring 234 disposed under tension connects the respective extensions of each link. The sections of the links move relatively during the initial opening movement of the main door, this relative movement occurring until the springs 234 have been active for engaging the adjacently disposed extensions of the sections of each link whereupon the links move as a unit for rocking the hinge pins of the wing doors and opening these doors.

During the described initial phase of movement, the sections 230 of the links connected to the hinge rods of the wing doors merely pivot on the pivot connections and it is only when contact has been established between connections that the links are active for swinging the wing doors into open position. As shown in Figures 17 and 18 of the drawings, the upper end of the main switch control lever fits into a guideway formed of a strip 235ᵃ which is secured to the link by abutment pins 235. The inner pin 235 is engaged by the lever when the switch is in closed or on position and when the doors are closed. During the initial phase of movement of the main door, the main switch control lever is automatically swung on its fulcrum by the aforesaid contact between the lever 209 and pin 235 and as the roller 217 in the link thereof passes the tip between the inclined cam edges, the switch snaps into open or off position. Opening movements of the doors are limited to approximately horizontal position due to the contact of the links with abutments 236 secured on the respective inner sides of the lamp casing.

The coil springs 234 under tension in the linkages joining the main door with the wing doors become effective after the wing doors have been closed and the main door is about half closed for imparting a resistance to closing movement of the door for a portion of the remaining closing movement and a final closing impetus. The action of the springs for these results is due to the fact that after the door is half closed and the side doors are entirely closed, the sections of each link begin to move relatively. The first effect produced by this relative movement is to resist closing movement of the door due to the fact that the sections of the links are moving in a direction on their pivots for tensioning the springs. After the pivotal connections 232 and 237 of the linkages to the door have passed below a certain plane, the relative swinging movements of the sections are reversed, and the spring tension is effective for imparting a final closing movement to the door.

Inasmuch as the head of the lamp containing all the mechanisms described is quite heavy, it is necessary to provide a means for counteracting the tendency of the sections to rapidly telescope under the weight, thereby aiding in raising the head during adjusting maneuvers.

A counterbalance spring 238 is inserted in the post against the sleeve at the top of the upper or outer section of the post and is compressed at its lower end against a disc 239 located in the lower end of the lower section. The disc is held in position against downward displacement by means of a pair of abutment lugs 240 drawn against the inner sides of the post at diametrically opposite sides by means of screws 241. The compression force of the spring is sufficient to approximately counter-act the weight of the lamp so that it is relatively easy to raise the same for telescoping movement of the sections and adjustments in the height of the lamp.

The sections are splined together by means of a groove in the flange 246 at the lower end of the inner tube slidably engaging the seam of the outer tube whereby the tubes are free to telescope and are held against rotation.

For the purpose of securing the sections in any adjusted position, a sleeve 242 is fixed on the top of the lower section, this sleeve carrying the adjusting knob 37 including a screw 38 entered into a radial boss thereof. The clamping or binding sleeve or bushing 39 is mounted between the respective sections 34, 35, adjacent the clamping knob, the clamping sleeve being of split construction and including a friction lining 243. Pressures are imparted to the sleeve 39 by means of the knob screw-threaded into the outer collar through a floating pin 244 slidably disposed in a bushing 245 radially fixed in the outer sleeve, the respective ends of the floating pin engaged by the screw 38 and engaged against the clamping sleeve.

Since the clamping pressure is exerted at the upper end of the sleeve, the lower end is split longitudinally and partially circumferentially as at 245 about midway of the sleeve to permit the lower end of the sleeve to flex freely. To compensate for the spacing of the sections, caused by the clamping sleeve at the upper end of the lower section for preventing swaying of the lower end of the inner section, an annular flange 246 is outwardly turned on the extreme lower end of this section for engaging the wall of the outer section.

Inasmuch as the inner section of the post is of a diameter somewhat smaller than the outer section to provide the clearance therebetween for the binding sleeve 39, the coil spring 238 as disposed within the inner section would have a tendency to be displaced laterally at the lower end as the upper section is telescoped upwardly. For this reason a spring housing sleeve or tube 238$^a$ is provided within the inner section, this sleeve 238$^a$ being stationary by virtue of its attachment to the disc which supports the lower end of the spring by means of lugs 238$^b$ struck outward from the lower edge of the tube and extended through openings in the disc in which the lugs are clinched.

The outer or lower section is supported in a boss 247 formed centrally of the base, the screws 241 supporting the abutment lugs 240 traversing the sleeve and boss for the purpose of holding the lower section in position in the base.

The autotransformer 42, which is mounted at one side of the post and upon the base, is of conventional structure. At the opposite side of the post from the transformer, two coils 248, 248 are supported, which coils constitute the ballast 43 which maintains even wattage despite increase in the width of the arc gap. These electrical elements 42, 43, mounted on the base are enclosed in a casing or housing. This casing consists of a top plate 249 surrounding the lower section of the post and supported on four rods 250. A false top 251 is mounted above the main top of the casing also being supported on the rods 250 which extend through the top plate. This false top is spaced from the top plate 249 by means of spacer sleeves 252 inserted on the rods between the respective tops. Nuts 253 are provided on these rods for securing the respective tops in fixed spaced position and the rods in the base. The false top is provided for preventing physical contact with the main top of the casing which may become hot and for suitably embellishing the machine.

The sides of the casing are removably attached and are arranged in two pieces, one of which, namely 254, includes three sides of the casing and the other, namely 255, the remaining one side. A rim 256 around the outer edge of the base maintains the side walls of the casing against outward displacement when they have been assembled. These sides are attached together and to the top of the casing by means of screws. Series of ventilating holes 257 at the top and the bottom of the casing are provided in the side walls for permitting the escape of the heat created by the electrical units in the base. The base is also apertured to permit air draft from under the base upwardly through the casing and outwardly through the perforations in the casing.

A pair of spaced baffle plates 258 is mounted between the transformer and the ballast coils to permit an air draft between these electrical units via the space between the plates. Immediately over and across the ballast coils a heat deflector element 259 is provided for diverting the convection heat, the element being of slightly irregular V-shape and secured against the underside of the top of the casing. The inwardly disposed wall of this element is of greater area than the outwardly disposed wall and the heat diverting point 259$^a$ is disposed toward the outside whereby about three-fourths of the convection heat is deflected toward the inner side and the remainder toward the adjacent outer casing wall. This prevents crowding of the heat into the one side toward which the deflector is generally disposed.

In operating an electric arc, some type of ballast must be incorporated in the supply circuit to the arc. This is because of the fact that the volt ampere characteristics of the arc are such that the voltage across the arc decreases as the current is increased. This characteristic, as is well known, would lead to unstable operation unless ballast is provided in the supply circuit to the arc. The particular design of the ballast is such that with a minimum amount of energy consumed in the ballast a practically constant amount of energy is delivered in the arc throughout its burning time, due to the automatic change in the resistance of the ballast with differences in current. These differences in current are due, first, to the natural instability of the arc and secondly, to the difference in resistance of the arc path, due to the consumption of the electrodes, resulting in a greater spacing between their tips.

The results obtained in the present ballast are primarily due to the use of a ballast wire material having a high coefficient of resistance change with changing temperature, the resistance change being positive with regard to increase in temperature. Equally important, however, is the proper proportioning of the ballast wire cross sections and the design of the frame supporting it, to insure proper and uniform radiation of heat. To insure the quick response of the ballast unit with changes in current, which necessitates the immediate balance being established between the amount of energy developed in the ballast and that radiated, the physical mass of the ballast, which determines, of course the thermal inertia of the ballast, must be kept as low as possible. If this is not done, the current in the arc will tend to swing higher or lower than is permissible before the ballast can accommodate itself to the changed condition. Under these circumstances it would be necessary to use a ballast of greater fundamental resistance in order to properly stabilize the arc and this would mean a larger consumption of energy in the ballast than is desirable.

By using two flat ribbon resistance conductors in parallel and by proportioning the cross section of these conductors so that the width is approximately ten times the thickness (.090 x .010 inch) and by supporting these wires on a properly designed frame, a highly responsive ballast is obtained, in which the physical mass of the ballast wire material is very low and the heat radiating surface quite large in proportion.

The design of the supporting frame is such that uniform free radiation is provided with a minimum amount of supporting contact to the wire. Increasing the amount of supporting contact to the wire is detrimental in that it does not allow the wire as a whole to change temperature in accord with the change in resistance, but tends to flatten out the resistance voltage curve of the ballast and furthermore introduces thermal inertia effect.

In the range of temperature through which the ballast is designed to operate, a decrease of fifteen percent in the current flowing through the ballast arc circuit will result in a decrease in resistance of the ballast of approximately thirty percent. Thus it will be seen that as the current in the arc tends to fall off and does fall off somewhat, due to the increased electrode spacing, the resistance of the ballast and therefore the amount of energy consumed in the ballast, decreases so that the output in volt amperes at the arc remains practically constant.

As stated, two coils are provided for the ballast. Each of these coils is supported on a spider of cross form in end view, the spider frame 260 being of relatively light material. The spider is supported on the adjacent one of the baffle plates between the ballast and the transformer. The spider frame is formed of spaced crosses 261 having their tips joined by strips of metal 262. Upon each longitudinal outer edge of the spider formed by the strips 262, a support element 263 of heat and electrical insulating material is mounted, the support element including a slot 264 in its inner edge engaged over the edge of the spider and having a series of transverse notches 265 in its outer edge. The coil 266 of the ballast of ribbon wire is wound about the spider, the wires being engaged in the transverse slots or notches. The wire coiled about the spider initially extends from a terminal 267 mounted on the lower cross of the support and its upper end is returned to the base being threaded through porcelain eyelets 268 mounted on the strips 262 interiorly of the coil and attached to a terminal 269 on the lower cross.

The support elements are tapered to relatively sharp longitudinal edges to provide a minimum wire contact and are of material which is the best suitable for non-conductivity of heat in order that the support does not interfere with the heat changes normally taking place in the wire coils.

It is believed that the arrangement of the ballast coils as related to the circuit will be fully apparent from the wiring diagram. The wiring circuit is illustrated in Figure 22. Alternating current is used and two incoming leads are provided. One of these leads, namely 270, extends directly to the three contact main switch 44 mounted on the lamp casing. The other lead, namely 271, extends to the transformer and from the transformer two leads 272, 273 extend to the remaining two contacts of the main switch 44.

The ballast coils 248 are inserted in the lead 273. The lead 273 containing the ballast coils extends through the magnet controlling the arc and thence to one of the electrodes 49. The other two leads, namely 272 from the transformer and the other main line 270, are connected at the main switch and extend as a single lead to the lower blade 135 of the starting resistance control switch in the wing of the lamp casing also being connected to one end of the resistance coil 46. The other end of the resistance coil 46 is connected to the upper blade 133 of the switch and to the other electrode, whereas the intermediate blade 134 of the switch is connected to an intermediate coil of the resistance by a wire 274.

Under normal running conditions, the current passes directly to the electrodes through the two leads, the starting resistance being cut out or shunted. The operation of the starting switch will be understood from the previous description.

In the operation of the lamp, it is necessary in complying with certain regulations prescribed by the underwriters to provide a screen in front of the arc so that the operator cannot contact the same. The grill of the door consists of wires

193, disposed radially of the arc, attached at their outer ends in the frame of the door and terminating in front of the arc at their inner ends and carrying a frame 276. This frame includes guides 277 along the lower and side edges on its rear side so that the screen 278, which is bound by a metal frame 279, may be slid downwardly into the guides.

In some instances, it is desirable to use a filtering instrumentality in place of the screen for decreasing the intensity of the rays as in cases where slow treatment is desired. In this case, a transparency 280 is used bound by a frame strip 281 readily slid into position as described.

In other cases it is desirable to utilize only the infra-red rays. In these cases a blind is provided for cutting off the ultra-violet rays which flow through the port in front of the arc chamber casing. To accomplish this, a metal frame 282 is provided fitting in the guides of the grill frame 276 and including a pair of spaced support brackets 283 of refractory material, for heat insulating and electrical purposes, extending from the rear side and supporting a plate 284 which, when the device is inserted, is disposed directly in front of the port hole of the arc chamber casing. This plate is mounted on cross straps 285 extending between the brackets. The plate 284 thus mounted becomes extremely hot and adds to the infra-red radiation.

In still other cases it is desirable to localize the rays as in the case of intensified treatment where the part to be treated is placed very close to the arc. For this purpose, an accessory 286 is hung over the door of the machine. This accessory consists of a main casing opening at the front and rear and having wire mesh 287 at the top and bottom for permitting cooling and for aesthetic purposes. This casing is readily attached over the door of the machine by means of a pair of hooks 288 at the lower edge of the casing adapted to hook over the lower portion of the door frame and a clamping device 289 at the upper end of the casing pivotally attached thereto as at 290 and including a handle 291 for swinging the same into clamping position over the stack. This clamp is formed of strip metal bent to encircle the stack and having bakelite buttons 292 thereon engaging the back of the stack. The ultra-violet ray control is provided in the front opening of the casing.

An element 293 including a flared mouth-piece 294 is attached to the face of the casing for providing a laterally disposed slideway 295 over the front opening thereof. Any number of slides 296 may be provided containing openings 297 of varying sizes which may be readily slid into position within the slideway for permitting the egress of a prescribed amount of ultra-violet rays. These slides include handles 298 at their outer ends for convenient manipulation. A plate 299 is mounted across and within the casing including an opening 300 of a size which is non-interfering with the rays passing through the light control opening in any particular slide. this plate having rearwardly extending wings 301 at each side spaced inwardly from the sides of the casing whereby a draft is induced upwardly through the casing for aiding in ventilating and cooling the lamp casing. The plate 299 serves as a baffle for the forward wall of the accessory and becomes extremely hot due to the infra-red rays. It is rapidly cooled however by the air circulating upwardly through the casing. This accessory localizes the treatment and reduces the beam of infra-red radiation without minimizing the beam of ultra-violet rays.

Having described our invention, we desire to be limited only by the ensuing claims:

1. A therapeutic arc lamp, comprising, a reflector, a supporting member secured to said reflector, a removable housing having a slideway connected therewith, said slideway engaging the supporting member, electrodes located in said housing and guide supports on said supporting member for the ends of the electrodes opposite to the ends within the housing so that the said supports and the electrodes in combination stabilize and position the housing within the reflector, but the housing may be removed from the reflector if the electrodes are withdrawn.

2. In a therapeutic arc lamp, the combination comprising, an arc housing, electrodes removably located in said housing, the housing closely associated with said electrodes so as to become incandescent when an arc is established between said electrodes, brushes contacting said electrodes at points adjacent to those at which they enter the housing, refractory flanges transversely projecting from said housing adjacent to the points of entrance of the electrode, said refractory flanges protecting the brushes from the heat of the housing when an arc is established, and heat radiating holders for said brushes adjacent said flanges.

3. A therapeutic arc lamp, comprising, a reflector, a supporting member extending outwardly from said reflector, a housing having a slideway connected therewith, said slideway engaging the supporting member so that the housing is slidable vertically, electrodes entering said housing, supports for the ends of the electrodes opposite to the ends within the housing so that the support and the electrodes in combination stabilize and position the housing within the reflector, but the housing may be removed from the reflector if the electrodes are withdrawn, and mechanism for adjusting said holders to position the electrodes within the housing, said mechanism protected by the reflector from the heat about the arc and housing.

4. A therapeutic arc lamp, comprising, a housing, electrodes adapted to enter into said housing, brushes contacting said electrodes at points adjacent to those at which they enter the housing, and means adapted to protect the brushes from the heat of the housing, said means comprising flanges of refractory material transversely projecting from the housing at the portions thereof adjacent the points of entrance of said electrodes.

5. A therapeutic arc lamp, comprising, a reflector, a plurality of posts extending horizontally outwardly from said reflector, a housing provided with slots engaging said posts so that the housing is movable vertically on said posts, horizontally disposed electrodes entering said housing, and supports for the ends of the electrodes opposite to the ends within the housing so that the posts and the electrodes in combination stabilize and position the housing within the reflector, but the housing may be removed from the reflector if the electrodes are withdrawn.

6. The method of providing a therapeutic arc which comprises establishing an arc between a pair of spaced electrodes, said arc of sufficient power to erode said electrodes and provide a beam of radiation of therapeutic value, partially housing said electrodes for controlling the arc whereby the ratio of electrode erosion and intensity of the therapeutic beam are co-related so that the arc operates for a period sufficient to consumate a complete treatment but extinguishes itself by reason of its increasing length prior to the time that a serious overdosage to the patient could be caused by the beam resulting from the electrode eroding arc.

7. In an arc lamp, a pair of electrodes, means for establishing an arc between said electrodes, a housing surrounding said electrode ends so closely as to be raised to incandescence upon arcing of the electrodes, a heat radiant fin having slots therein depending from said housing, and a support for said housing with which the fin thereof is detachably engaged in resting relation.

8. In a therapeutic arc lamp, the combination comprising, a casing having a reflector therein and spaced therefrom to provide an air duct, an apertured housing removably mounted in said reflector, electrodes disposed within said housing, said housing so closely associated with said electrodes as to become incandescent when an arc has been established between the electrodes, the duct between said casing and said reflector comprising a passageway for a current of air to cool said reflector.

9. A therapeutic arc lamp, comprising, a reflector, an apertured electrode housing mounted within said reflector so as to be disengageable and removable therefrom, electrodes disposed within said housing and related in position therein for emission of ultra-violet rays from the aperture thereof, said housing heatable to incandescence as a source of infra-red rays upon arcing between the electrodes, said reflector positioned to project the infra-red ray radiation into the same general path taken by the ultra-violet rays, refractory flanges on said housing radially slotted at points about the peripheries thereof, electrode supports adjacent said refractory flanges slidably sustaining said electrodes enabling the establishment of arcing between the electrodes upon contact and spacing thereof, and mechanical means associated with said electrodes operable from a point outside the reflector, and shielded from the heat by the reflector for causing contact of the electrodes, the establishment of arcing, and adjustment of the length of the arc.

10. In a therapeutic lamp, the combination comprising, arc electrodes, a housing surrounding said electrode ends so closely as to be raised to incandescence when an arc is established between the ends of the electrodes, said housing having an aperture substantially central of the ends of the electrodes therein, and a depending fin having slots therein, supports with which the slots of the fin are relatively loosely engageable to constitute a standard for said housing whereby the same is removable therefrom, refractory flanges transversely projecting from said housing thereof at the opposite ends, and a reflector disposed about said housing, said reflector sustaining said support with which said housing is removably associated, said housing prevented from tilting through engagement of the electrodes and the apertures in the end refractory flanges.

JOHN G. H. LIEBEL.
EDWIN S. FLARSHEIM.